(12) United States Patent
Hayes

(10) Patent No.: US 9,017,512 B2
(45) Date of Patent: Apr. 28, 2015

(54) RELEASE LINER AND METHOD OF USING SAME

(75) Inventor: James T. Hayes, Glens Falls, NY (US)

(73) Assignee: Avery Dennison Corporation, Glendale, CA (US)

( * ) Notice: Subject to any disclaimer, the term of this patent is extended or adjusted under 35 U.S.C. 154(b) by 931 days.

(21) Appl. No.: 11/995,229

(22) PCT Filed: Jul. 25, 2006

(86) PCT No.: PCT/US2006/028775
§ 371 (c)(1),
(2), (4) Date: Jan. 10, 2008

(87) PCT Pub. No.: WO2007/016068
PCT Pub. Date: Feb. 8, 2007

(65) Prior Publication Data
US 2008/0193696 A1  Aug. 14, 2008

Related U.S. Application Data

(60) Provisional application No. 60/704,406, filed on Aug. 1, 2005.

(51) Int. Cl.
*B32B 33/00* (2006.01)
*B05D 3/00* (2006.01)
*C09D 183/04* (2006.01)
*C09J 7/02* (2006.01)
*C08K 3/36* (2006.01)

(52) U.S. Cl.
CPC ............ *C09J 7/0225* (2013.01); *C08K 3/36* (2013.01); *C08L 2666/54* (2013.01); *C09D 183/04* (2013.01); *C09J 7/0217* (2013.01); *C09J 2433/00* (2013.01); *C09J 2467/006* (2013.01); *C09J 2483/005* (2013.01); *Y10T 428/1476* (2013.01)

(58) Field of Classification Search
USPC ........................ 156/325; 427/387; 428/41.8
See application file for complete search history.

(56) References Cited

U.S. PATENT DOCUMENTS

| 4,822,687 A * | 4/1989 | Kessel et al. .................. 428/447 |
| 6,013,722 A * | 1/2000 | Yang et al. ..................... 524/558 |
| 6,120,868 A * | 9/2000 | Heberger et al. ............ 428/41.4 |
| 6,486,267 B1 | 11/2002 | Bilodeau |
| 6,503,620 B1 * | 1/2003 | Xie et al. ...................... 428/354 |
| 6,737,119 B1 * | 5/2004 | Kim et al. ..................... 427/387 |
| 2006/0128921 A1 * | 6/2006 | Cray et al. ....................... 528/31 |

FOREIGN PATENT DOCUMENTS

WO   2004/046267   6/2004

OTHER PUBLICATIONS

International Search Report from corresponding PCT/US2006/028775 mailed Dec. 19, 2006.

* cited by examiner

*Primary Examiner* — Michael Orlando
*Assistant Examiner* — Daniel Lee
(74) *Attorney, Agent, or Firm* — Avery Dennison Corporation

(57) ABSTRACT

A method for improving the optical clarity of a coated adhesive layer is described that comprises applying a curable composition onto the substrate surface, the curable composition comprising (a) a curable organopolysiloxane; and (b) a plurality of silica particles having an average particle size within the range of about 1 to about 7 micrometers.

24 Claims, No Drawings

US 9,017,512 B2

RELEASE LINER AND METHOD OF USING SAME

This application claims priority to provisional patent application Ser. No. 60/704,406 filed Aug. 1, 2005, the content of which is hereby incorporated by reference in its entirety.

TECHNICAL FIELD

This invention relates to silicone release liners, and in particular, to silicone release liners that reduce or eliminate air entrapment during adhesive coating operations. The release liners are particularly useful for curtain coating adhesive compositions.

BACKGROUND

Release compositions are used, for example, to coat papers or films that are used as release backing sheets overlying the pressure sensitive adhesive layer used in pressure sensitive adhesive (PSA) products such as labels, decals, tapes, etc. The PSA adheres to the release coated surface of the release backing sheet sufficiently to enable the pressure sensitive products to be handled prior to use. When such products are used, the release backing sheet is pulled off and discarded. The exposed PSA is pressed onto a surface where the pressure sensitive product is to be placed.

The PSA layer may be applied to the release liner as a coating by any conventional technique known in the coating art such as roller coating, curtain coating, brushing, spraying, reverse roll coating, doctor knife, dipping, die coating, offset gravure techniques, etc. In the manufacture of adhesive coated articles, including labels, using the curtain coating method, there is often the problem of air entrapment between the adhesive coating and the silicone release surface of the release liner. The problem may manifest itself as hazing and/or bubbles in the adhesive layer. This problem is particularly troublesome when the adhesive article or label facestock and the adhesive layer are both clear.

Clear polymeric labels are increasingly desired, since they provide a no-label look to decorated glass and plastic containers. Paper labels block the visibility of the container and/or the contents in the container. Clear labels enhance the visual aesthetics of the container, and therefore the products, and are growing much faster than paper labels in the package decoration market as consumer product companies are continuously trying to upgrade the appearance of their products on store shelves.

There is a need, therefore, for improved methods of forming clear adhesive layers, particularly for adhesive layers to be used in clear labels. More specifically, there is a need for an improved silicone release liner for use in adhesive coating operations such as curtain coating.

SUMMARY

The present invention provides a method of improving the optical clarity of a coated adhesive layer, comprising (a) providing release liner substrate having a surface; (b) applying a curable composition onto the substrate surface, the curable composition comprising (i) a curable organopolysiloxane; and (ii) a plurality of silica particles having an average particle size within the range of about 1 to about 7 micrometers; (c) curing the curable composition to form a cured silicone release surface; and (d) coating an adhesive composition onto the cured silicone release surface.

In one embodiment, the invention is directed to a method of reducing or eliminating air entrapment between the release layer of a release liner and a coated adhesive layer. The method includes the steps of (a) providing release liner substrate having a surface; (b) applying a curable composition onto the substrate surface, the curable composition comprising (i) a curable organopolysiloxane; and (ii) a plurality of silica particles having an average particle size within the range of about 1 to about 7 micrometers; (c) curing the curable composition to form a cured silicone release surface; and (d) coating an adhesive composition onto the cured silicone release surface. The adhesive composition may be coated by curtain coating.

The curable release composition of the present invention, in one embodiment, comprises about 70% to about 98% by weight of at least one vinyl polydimethyl siloxane; about 2% to about 5% by weight of at least one methyl hydrogen polysiloxane; and about 0.1% to about 10% by weight of silica particles having an average particle size within the range of about 1 to about 7 micrometers.

DETAILED DESCRIPTION

The curable release composition used in the method of the present invention comprises at least one curable organopolysiloxane and silica. The organopolysiloxane, which may be a polydimethylsiloxane, may be room temperature cured, thermally cured or radiation cured. Generally, the room temperature and thermally curable compositions comprise at least one organopolysiloxane and at least one catalyst or curing agent for such organopolysiloxane(s). Such compositions may also contain at least one cure accelerator and/or adhesion promoter (sometimes referred to as an anchorage additive). As is known in the art, some materials have the capability of performing both functions, i.e., the capability of acting as a cure accelerator to increase the rate, reduce the curing temperature, etc., and also as an adhesion promoter to improve bonding of the silicone composition to the substrate. The use of such dual function additives where appropriate is within the purview of the invention.

A wide variety of organopolysiloxanes (commonly called silicones) can be used in the practice of the invention. Such organopolysiloxanes are also sometimes referred to as polymeric silicone resins, rubbers, oils or fluids. These organopolysiloxanes are well known and fully described in the literature. These organopolysiloxanes are comprised essentially of silicon atoms connected to each other by oxygen atoms through silicon-oxygen linkages, e.g.,

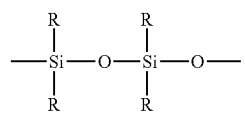

wherein each R is an organic group, generally an alkyl group having 1 to about 2 carbon atoms. The organopolysiloxanes, in one embodiment, are high molecular weight polymers or copolymers having molecular weights in the range of about 5,000 to 250,000.

Radiation curable organopolysiloxanes may be useful. These can be cured by ultraviolet or electron beam radiation with or without the assistance of a photoinitiator.

In one embodiment, the organopolysiloxane may be an organosiloxane represented by the formula $$(R_3SiO)_x(SiO_{4/2})_y \qquad (1)$$

wherein each R is independently a hydrocarbon group or a group represented by the formula

 (2)

wherein R* is hydrogen or a methyl or ethyl group; x is a number from about 1 to about 75, and in one embodiment about 3 to about 26; y is a number from about 1 to about 56, and in one embodiment from about 10 to about 20; and the ratio of x to y is from about 0.3:1 to about 1.5, and in one embodiment to about 0.3 to about 1.3:1, and in one embodiment 0.7:1 to about 1.5:1. Each R in formula (1) may be the same or different and may contain up to about 10 carbon atoms, and in one embodiment about 2 to about 6 carbon atoms. Each R can be independently an alkyl group such as methyl, ethyl, isopropyl, butyl or hexyl; an alkenyl group such as vinyl, allyl or hexenyl; and aryl group such as phenyl, tolyl or xylyl; and aralkyl group such as beta-phenylethyl or beta-phenylpropyl; a cycloaliphatic group such as cyclopentyl, cyclohexyl or cyclohexenyl; or an acrylic group such as acrylate or methacrylate.

In one embodiment, the organopolysiloxane comprises a vinylpolydimethylsiloxane. Examples of commercially available vinylpolydimethylsiloxanes include Syl-Off® 7818 from Dow Corning Corp., Dehesive 914 from Wacker Silicones, and SL7035 and SL6670 from GE Silicones.

In one embodiment, the curable organopolysiloxane comprises an alkenyl functional polydimethyl siloxane. The alkenyl functional siloxane may be crosslinked with a hydrogen functional siloxane. Examples of useful commercially available hydrogen functional siloxane crosslinkers include Syl-Off® 7048 from Dow Corning Corp., Vernetzer V-24 from Wacker Silicones and SS4300C from GE Silicones.

Suitable catalysts which can be employed in the curing of the release compositions of the invention include various compounds containing metals such as tin, lead, platinum, rhodium, etc. Generally, the catalysts may be tin, platinum or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, various organic peroxides such as benzoyl peroxide and 2,4-dichlorobenzoyl peroxide, and others well known in the art as curing agents or catalysts for organopolysiloxane (silicone) materials. Useful catalysts include the carboxylic acid salts of organotin compounds containing at least one carbon-tin bond. Metal complexes of platinum and rhodium are also useful. Amines and amines derivatives such as diethylene triamine, triethylene tetramine and ethanol amine, as well as amine precursors such as the isocyanate compounds and amine-functional silanes such as gamma-aminopropyl triethoxy silane can also be used as curing catalysts. The amine salts of carboxylic acids can also be used as curing agents in the inventive release compositions. In one embodiment, the catalyst comprises a platinum-containing catalyst.

The release composition may contain an inhibitor for the catalyst. Examples of various classes of catalyst inhibitors include ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated ene-ynes, hydroperoxides, ketones, sulfoxides, amines, phosphines, phosphites, nitrites and diaziridines. Useful inhibitors for the release composition when the catalyst comprises a platinum group metal catalyst include the maleates and alkynyl alcohols.

The cure accelerators and/or adhesion promoters that can be used in the release compositions are also well known in the art. Exemplary of such cure accelerators and/or adhesion promoters are amines, amine-functional silanes and amine precursors previously discussed as well as other silane derivatives such as acetoxy-functional silanes and orthosilicates. Examples of commercially available silicone adhesion promoters include Syl-Off® 297 from Dow Corning Corp. and AnchorSil 2000 from GE Advanced Materials.

At least some of these compounds also function as curing catalysts per se as well as cure accelerators and/or adhesion promoters. The amount of curing agent or catalyst, cure accelerator and/or adhesion promoter employed in the inventive release compositions can be varied widely depending upon the curing temperature, the particular catalyst used, the particular organopolysiloxane materials selected, the particular cure accelerator and/or adhesion promoter used, the substrate, desired curing time, etc. Usually the amount of any of such components will be in the range of 0.5 to 20 weight percent of the organopolysiloxane.

The release composition comprises a plurality of silica particles. In one embodiment, the silica particles have an average particle size in the range of about 1 micrometer to about 7 micrometers, or about 1 micrometer to about 5 micrometers, or about 2 micrometers to about 4 micrometers. Useful commercially available silicas include ACEMATT OK 412 from Degussa AG, Lo-Vel 2003 and Lo-Vel 2023 from PPG and Syloid 7000 from W. R. Grace.

In one embodiment, the silica particles comprise an organic surface treated silica. The surface treatment may include treating the silica with a silanizing agent. Silanizing agents include halosilanes, alkoxysilanes, silazanes and/or siloxanes. Such treated silica particles are described in U.S. Patent Publication US 2004/0120876, which is hereby incorporated by reference.

In one embodiment, the release composition comprises an amount of silica particles in the range of about 0.1 to about 10% by weight based on the total weight of the composition. In one embodiment, the release composition comprises about 0.2% to about 5% by weight, or about 0.2% to about 1% by weight based on the total weight of the composition.

The release composition may contain at least one photoinitiator. The amount of photoinitiator included in the release compositions may range from about 0% to about 10% by weight, and in one embodiment from about 0.5% to about 5% by weight, based on the total weight of the release composition (excluding the weight of the surface treated particulate solids). A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc.

Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

The photoinitiator may be an onium salt. Examples of the onium salts that can be used include bis(alkylphenyl)

iodinium hexafluroantimonate and bis(alkyl phenyl) iodinium tetralkis pentafluoro phenyl borate, wherein the alkyl groups independently contain 1 to about 18 carbon atoms, and in one embodiment about 6 to about 18 carbon atoms, and in one embodiment about 12 carbon atoms. These compounds are known in the art.

The release composition may be utilized as a solventless composition, a composition diluted by a suitable solvent, or as an aqueous emulsion. The composition may find use as a release coating for paper and polymeric substrates, and in particular, as a release coating for polyester substrates.

Various other additives may be incorporated into the release composition, including silicone release modifiers, fillers, reactive diluents, adhesion promoters, solvents, etc.

The release compositions of the present invention may be applied to the desired substrate as a coating by any conventional technique known in the coating art such as roller coating, curtain coating, brushing, spraying, reverse roll coating, doctor knife, dipping, die coating, offset gravure techniques, etc.

A variety of substrates can be coated with the release compositions, and these compositions can be applied to any substrate when it is desirable to modify the release properties of a surface of the substrate. For example, the compositions of the present invention can be employed to form release coatings on substrates such as paper, vinyl, polyvinyl chloride films, polyester films, polyolefin films, non-woven fabrics, glass, steel, aluminum, etc. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. The present invention is particularly useful in providing release characteristics to paper and polymeric films.

The amount of the release composition applied to the various substrates varies depending upon the characteristics of the substrate, the properties desired in the release coating, the radiation source utilized, and the particular formulation of the release composition. If an excess of the release composition is applied to the substrate, the physical characteristics of the substrate may be affected in an undesirable manner. Also, for economic reasons, it is normally desired to apply the lowest amount of coating to obtain the desired result. Thus, applied coating weights may, depending on the substrate and intended use, vary over a wide range but typically range from about 0.1 to about 10 or more grams per square meter (gsm), or about 0.5 to about 5 gsm, or about 1 to about 3 gsm.

In one embodiment, curing of the release composition is performed at room temperature depending upon the particular organopolysiloxane used and the particular curing agent or catalyst used in conjunction with the organopolysiloxane.

In one embodiment, the release composition is cured by exposure to known forms of ionizing or actinic non-ionizing radiation. Useful types of radiation include ultraviolet light, electron beam, x-ray, gamma-ray, beta-ray, etc. If ultraviolet light is to be used as the form of radiation, a photoinitiator such as described above is included in the curable release composition. One of the advantages of using radiation to effect cure of the composition is that polymerization takes place rapidly at ambient temperature, and heating is not necessary. The equipment for generating these forms of radiation are well known to those skilled in the art.

The present invention also provides for the use of the compositions described above in the preparation of multilayer articles or constructions comprising (a) a first substrate; (b) a second substrate; (c) a release layer comprising the inventive release coating composition which has been cured, and (d) a layer comprising a pressure-sensitive adhesive composition, wherein the release layer (c) is positioned between the first substrate and the layer of pressure-sensitive adhesive and is preferentially adherent to the first substrate, and the pressure-sensitive adhesive layer (d) is positioned between the release layer and the second substrate and is preferentially adherent to the second substrate. Additional layers can be interdispersed between the first substrate and the layer of pressure-sensitive adhesive and between the second substrate and the release layer to provide additional desirable properties such as increased strength, increased dimensional stability, etc. The first and second substrates may comprise a variety of materials including paper, polymer films (e.g., polyolefins, vinyl, polyester, etc.) aluminum, etc.

In one embodiment, the multilayer article comprises (a) a first substrate; (b) an optically clear second substrate; (c) a release layer comprising the release composition of claim 1 that has been cured; and (d) an optically clear pressure-sensitive adhesive layer, wherein the release layer (c) is positioned between the first substrate and the layer of pressure-sensitive adhesive (d) and is preferentially adherent to the first substrate, and the pressure sensitive adhesive layer (d) is positioned between the release layer and the second substrate and is preferentially adherent to the second substrate.

With reference to the multi-layered articles or constructions utilizing at least one layer of a pressure-sensitive adhesive composition, any pressure-sensitive adhesive composition known in the art can be utilized. Such adhesive compositions are described in, for example, "Adhesion and Bonding", Encyclopedia of Polymer Science and Engineering, Vol. 1, pages 476-546, Interscience Publishers, 2nd Ed. 1985. Such compositions may contain an adhesive polymer such as natural, reclaimed or styrene-butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, oil-soluble phenolics, or polyterpenes; antioxidants; plasticizers such as mineral oil or liquid polyisobutylenes; and fillers such as zinc oxide or hydrated alumina. The selection of the pressure-sensitive adhesive to be used in any particular multi-layer article or construction is not critical to this invention, and those skilled in the art are familiar with many suitable pressure-sensitive adhesives. However, as known to those skilled in the art, the pressure-sensitive adhesive and the release layer should not chemically react.

In one embodiment, the multilayered construction comprises a first substrate that is a polyester film, a release layer overlying the polyester film, an adhesive layer overlying and in contact with the release layer, and a second substrate that is a polyolefin film adhered to the adhesive layer. The polyolefin film may comprise a clear biaxially oriented polypropylene (BOPP) film. The adhesive layer may comprise an acrylic emulsion adhesive.

Curtain coating techniques may be used to coat the adhesive layer onto the release layer of the release liner. As generally known to those of skill in the art, in curtain coating, a liquid sheet is expressed from an apparatus such as a die, and falls freely over a distance until it impinges upon a moving substrate to be coated. The liquid sheet impacts the surface, and if coating conditions are properly controlled, forms a layer thereon. Curtain coating may be considered a high speed coating process.

The web, or release liner moving underneath the curtain coating die typically travels from 1.0 or less up to about 20 m/s or more. This generates a great deal of air pressure near the surface of the release liner moving toward the falling liquid curtain. To prevent this moving air from disrupting the curtain, an air shield may be used. Another variable to control is the air content of the fluid being coated. Air bubbles in the curtain will transiently disrupt it, diminishing coating efficiency. Consequently, the fluid to be curtain coated may be deaerated prior to being pumped into the curtain coating die. As the liquid curtain impacts the moving web or release liner, air may become entrapped at the interface between the fluid (adhesive) and the web (release liner). The resulting adhesive layer may exhibit hazing or air bubbles as a result of the entrapped air.

The release layer of the present invention can reduce or eliminate the formation of bubbles because of its surface roughness. The silica particles of the release layer composition modify the surface of the cured release layer and allow for air egress during the adhesive drying process. The resulting adhesive layer may have less haze and improved optical clarity. The improved optical clarity is particularly beneficial when the adhesive is used in clear labels.

In the following example, the commercial materials that are used are as follows:

| Tradename | Chemical | Supplier |
|---|---|---|
| Syl-Off 7818 | Vinylpolydimethyl siloxane | Dow Corning Corp. |
| Dehesive 914 | Vinylpolydimethyl siloxane | Wacker Silicones |
| SL7025 | Vinylpolydimethyl siloxane Vinylpolydimethyl siloxane (>90%) | GE Silicones |
| SL6670 | Alkyl Branched & Vinyl Polysiloxanes (5-10%) (blended with Pt catalyst and maleate inhibitor) | GE Silicones |
| Syl-Off 7048 | Methyl hydrogen polysiloxane | Dow Corning Corp. |
| Vernetzer V-24 | Methyl hydrogen polysiloxane | Wacker Silicones |
| SS4300C | Methyl hydrogen polysiloxane | GE Silicones |
| Syl-Off 297 | Acetoxy and epoxy functional silsesquioxane | Dow Corning Corp. |
| HF-86 | Reactive silane ester | Wacker Silicones |
| Catalyst OL | Platinum catalyst concentrate, dispersed in vinyl polydimethyl siloxane Siloxanes and silicones, MeH, -Me (>90%) | Wacker Silicones |
| AnchorSil 2000 | Glysidoxypropyl, Me 2-(triethoxysilyl) ethyl propenyl glycidyl ether (1-5%) | GE Advanced Materials |
| Lo-Vel 2023 | Organic surface-treated silicon dioxide | PPG Industries |
| Syloid 7000 | Silica gel flatting agent | W. R. Grace |
| ACEMATT OK 412 | Organic surface-treated silicon dioxide | Degussa |

EXAMPLE 1

A release coating composition having the formulation indicated below is prepared (all numerical values in the table below being parts by weight):

| Ingredient | Amount |
|---|---|
| SylOff 7818 | 94.0 |
| Syl-Off 7048 | 3.0 |
| Syl-Off 297 | 2.0 |
| Lo-Vel 2023 | 1.0 |

EXAMPLE 2

A release coating composition having the formulation indicated below is prepared (all numerical values in the table below being parts by weight):

| Ingredient | Amount |
|---|---|
| Dehesive 914 | 93.5 |
| Vernetzer V-24 | 2.5 |
| Catalyst OL | 1.0 |
| HF-86 | 2.4 |
| Syloid 7000 | 0.6 |

EXAMPLE 3

A release coating composition having the formulation indicated below is prepared (all numerical values in the table below being parts by weight):

| Ingredient | Amount |
|---|---|
| SL6670 | 92.5 |
| SS4300C | 3.1 |
| AnchorSil 2000 | 3.9 |
| Acematt OK 412 | 0.5 |

EXAMPLE 4

A release coating composition having the formulation indicated below is prepared (all numerical values in the table below being parts by weight):

| Ingredient | Amount |
|---|---|
| SL7025 | 93.0 |
| SS4300C | 4.2 |
| AnchorSil 2000 | 2.0 |
| Lo-Vel 2023 | 0.8 |

The silicone release coating compositions may be applied to the liner substrate using a multi-roll, smooth roller coater, or may be applied using a three-roll offset gravure coater. With the multi-roll smooth roller coater, the press-ready silicone is squeezed through a series of alternating chrome and rubber rollers revolving at different speeds. This has the effect of uniformly effacing the silicone coating in a diminishing progression, until the final target applied coating weight is achieved. In one embodiment, the coat weight is between about 0.6 gms/m$^2$ to about 2.0 gms/m$^2$ (or about 0.4 to about 1.3 pounds/ream (3000 ft$^2$)). The application rate is controlled by the speed of the second roller in the coating head.

The offset gravure method is similar to flexographic printing, with the exception that the rubber roller surface is completely smooth and the speed of the roller is differentiated relative to the gravure roller to efface the silicone coating uniformly and achieve the target application rate. With this method, the coating weight is controlled by the engraving capacity of the anilox roller and the ratio of this roll to the line speed. Both methods are well known in the industry for applying solventless silicone coatings for thermal and radiation cure.

The coating composition of Example 3 is coated onto a 1.5 mil thick PET substrate using a three-roll offset gravure coater at various coat weights and at various silica loadings as shown in Table 1 below, and thermally cured using a high impingency air flotation dryer at a web temperature of about 150 to 160° C. An acrylic emulsion adhesive, S2001 available from Avery Dennison, is then curtain coated onto the release liner at a coat weight of 21 gsm and cured. A 2 mil thick clear BOPP facestock is applied to the adhesive layer. Upon removal of the release liner, the adhesive layer is evaluated for appearance and the haze of the facestock/adhesive construction is measured using a Hunter Lab Color Quest spectrophotometer.

TABLE 1

| Example | Si Coat Wt. (gsm) | Silica Loading (wt. %) | Adhesive Appearance | Haze Full construction |
| --- | --- | --- | --- | --- |
| Comparative | 1.0 | 0 | Unacceptable haze | 10% |
| 3A | 1.0 | 0.25 | Clear, low haze | 5.75% |
| 3B | 1.0 | 0.50 | Clear, low haze | 5.25% |
| 3C | 2.0 | 0.50 | Clear, low haze | 5.85% |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of improving the optical clarity of a coated adhesive layer, comprising:
   providing a release liner substrate having a surface;
   applying a curable composition onto the substrate surface, the curable composition comprising (a) a curable organopolysiloxane; and (b) a plurality of silica particles having an average particle size within the range of about 1 to about 7 micrometers;
   curing the curable composition to form a cured silicone release surface; and
   coating an optically clear adhesive composition onto the cured silicone release surface.

2. The method of claim 1 wherein the curable composition further comprises a crosslinker.

3. The method of claim 2 wherein the crosslinker comprises a hydrogen functional polysiloxane.

4. The method of claim 1 wherein the silica particles comprise organic surface treated silica particles.

5. The method of claim 1 wherein the adhesive composition comprises an emulsion acrylic adhesive.

6. The method of claim 5 further comprising drying the adhesive composition to form an adhesive layer.

7. The method of claim 1 wherein the coating step comprises curtain coating.

8. The method of claim 1 wherein the substrate comprises a polyester film.

9. The method of claim 1 wherein the silica particles have an average particle size within the range of about 2 to about 4 micrometers.

10. The method of claim 1 wherein the silica is treated with a silanizing agent.

11. The method of claim 1 wherein the organopolysiloxane comprises a vinylpolydimethylsiloxane.

12. The method of claim 1 wherein the organopolysiloxane comprises an alkenyl functional polydimethyl siloxane.

13. The method of claim 1 wherein the curable composition further comprises at least one photoinitiator.

14. The method of claim 1 wherein the curable composition comprises an amount of silica particles in the range of 0.2% to 1% by weight of the weight of the curable composition.

15. The method of claim 1 wherein the curable composition is utilized as a solventless composition.

16. A method of reducing air entrapment between a release surface of a release liner and a coated adhesive layer comprising:
   providing a release liner substrate having a surface;
   applying a curable composition onto the substrate surface, the curable composition comprising (a) a curable organopolysiloxane; and (b) a plurality of silica particles having an average particle size within the range of about 1 to about 7 micrometers;
   curing the curable composition to form a cured silicone release surface; and
   curtain coating an adhesive composition onto the cured silicone release surface.

17. The method of claim 16 wherein the organopolysiloxane comprises a thermally curable organopolysiloxane.

18. The method of claim 16 wherein the cured composition further comprises a crosslinker.

19. The method of claim 18 wherein the crosslinker comprises a hydrogen functional polysiloxane.

20. The method of claim 16 wherein the silica particles comprise organic surface treated silica particles.

21. The method of claim 16 wherein the adhesive composition comprises an emulsion acrylic adhesive.

22. The method of claim 21 wherein the method further comprises drying the adhesive composition to form an adhesive layer.

23. The method of claim 16 wherein the substrate comprises a polyester film.

24. The method of claim 16 wherein the silica particles have an average particle size within the range of about 2 to about 4 micrometers.

* * * * *